H. G. SEEBER.
BELT GRAIN-CONVEYERS.

No. 194,182. Patented Aug. 14, 1877.

Witnesses:
Theodore L. Hoster.
B. S. Shanks

Inventor:
Horatio G. Seeber
By Isaiah P. Fitch
his Atty

UNITED STATES PATENT OFFICE.

HORATIO G. SEEBER, OF BROOKLYN, NEW YORK.

IMPROVEMENT IN BELT GRAIN-CONVEYERS.

Specification forming part of Letters Patent No. 194,182, dated August 14, 1877; application filed March 9, 1877.

*To all whom it may concern:*

Be it known that I, HORATIO G. SEEBER, of the city of Brooklyn, State of New York, have invented a new and useful Improvement in Belt Grain-Conveyers, of which the following is a specification, reference being had to the accompanying drawings, being part of the same, in which—

Figure 1:
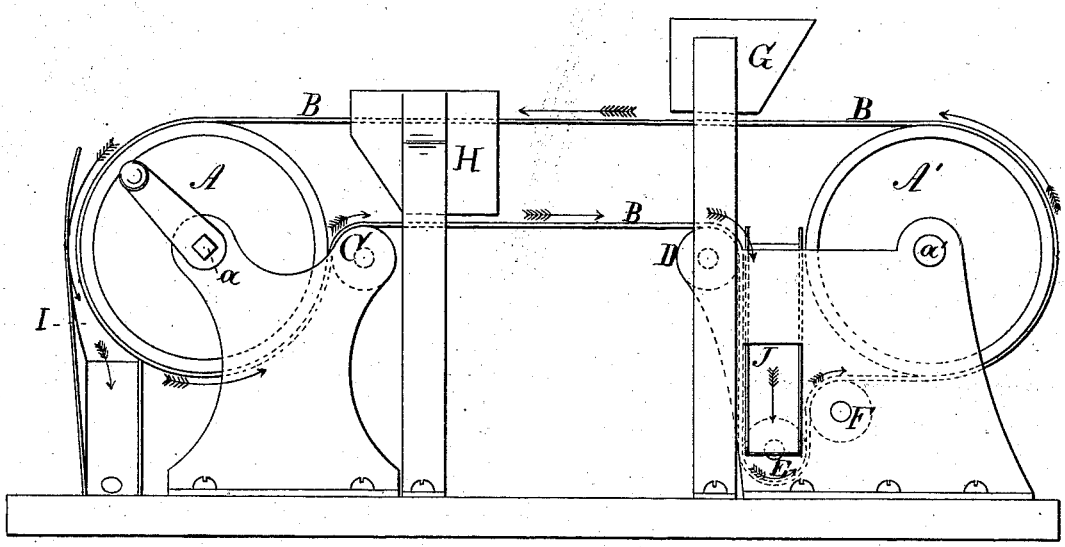
Figure 2:
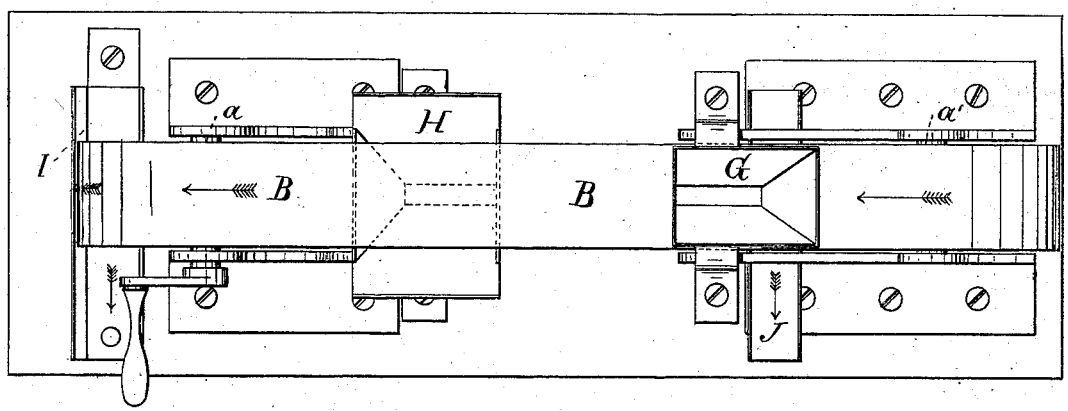

Figure 1 is a side elevation of a grain-conveyer embodying my improvement, and Fig. 2 a plan of the same.

My invention relates to that class of grain-conveyers that consist of a simple horizontal endless belt running over pulleys at each end of the apparatus; and my improvement consists in the peculiar devices and arrangement of parts hereinafter described and claimed, whereby the entire belt-conveyer throughout its entire course, both above and below the pulleys, is made to carry grain, the portion above the pulleys carrying grain in one direction, and that portion below the pulleys carrying grain in the opposite direction.

A and A' are two large pulleys, mounted upon shafts *a a'*. B is an endless belt, fitted to run upon the said pulleys, and constitutes the grain-conveyer. Power to drive the said belt-conveyer may be applied to either of the pulleys. The pulleys may be separated to any desired distance from each other, and the belt-conveyer made of a corresponding length.

The belt-conveyer may be the ordinary rubber or leather or other belting, and of any suitable width, say twenty-four to forty inches.

C D E F are smaller bearing or friction pulleys or rollers, designed to adjust the belt-conveyer to the pulleys A A', to tighten it and direct the course of the under portion of it, so as to adapt that portion to the carrying of grain.

G is a grain hopper or spout arranged over the upper portion of the belt-conveyer A, to deliver grain upon that portion; and H is a hopper or spout arranged over the lower portion of the belt-conveyer A, to deliver grain over upon the said lower portion. The said hopper H may at the sides extend above the upper portion of the belt-conveyer, as shown in the drawings, it being made of sufficient width at the top, and flared out so as to leave space between its inclined sides and the edge of the belt-conveyer that will run across it, to permit the grain to pass down such inclined sides past the edges of the belt-conveyer into the lower portion of it. I is a spout arranged to receive the grain as it is delivered from the upper portion of the belt-conveyer and conduct it away, and J is a spout arranged to receive the grain as it is delivered from the lower portion of the belt-conveyer.

The belt-conveyer, running in the direction indicated by the arrows in the drawings, will, upon running off from the roller D, pass down under the roller E, thus furnishing opportunity and space for the spout J so placed that the grain will be delivered from the belt-conveyer before it (the grain) reaches the pulley A'. Then, by passing up over the roller F, it is brought into contact with the semicircumference of the pulley A'.

Grain delivered upon the upper portion of the belt-conveyer through the hopper G will be discharged therefrom into the spout I, and grain delivered onto the lower portion of the belt-carrier will be discharged into the spout J.

Thus both the upper and lower portions of the belt-conveyer may be utilized for the carrying of grain.

If desired, the said belt-conveyer may be again turned back upon itself—that is to say, after running over the roller E, it may pass back to the opposite end of the apparatus, and there pass over a similar roller; then, folding back again upon itself, it may run over a roller suitably placed and arranged to enable said belt to pass thence over the roller F onto pulley A', the said roller F being so placed that the belt may pass onto the roller F without interference with the roller E. Then, by providing this last fold or portion of the belt-conveyer with a hopper and spout similar to H and J, the said conveyer may be made to carry two streams of grain at the same time in the same direction, and one in the opposite direction.

What I claim as my invention, and desire to secure by Letters Patent, is—

The belt-conveyer A, provided with the hoppers G and H and the spouts I and J, and with suitable bearing-rollers, to give the under portion of said belt direction in its course from one of the pulleys A A' to the other, for the discharge of the grain into said spout J, all constructed and arranged to operate as and for the purpose described.

Witness my hand this 5th day of March, 1877.

HORATIO G. SEEBER.

Witnesses:
 THEODORE G. HOSTER,
 B. S. CLARK.